Jan. 28, 1958     E. R. NYLAND     2,821,024
INSPECTION DEVICE

Filed Jan. 24, 1955     4 Sheets-Sheet 1

INVENTOR.
Edward R. Nyland
BY
L. D. Buch
ATTORNEY

INVENTOR.
Edward R. Nyland
BY
L. D. Burch
ATTORNEY

United States Patent Office 2,821,024
Patented Jan. 28, 1958

2,821,024

INSPECTION DEVICE

Edward R. Nyland, Detroit, Mich., assignor to General Motors Corporation, Detroit, Mich., a corporation of Delaware Application January 24, 1955, Serial No. 483,593

1 Claim. (Cl. 33—179.5)

This invention relates generally to apparatus for inspecting gear members or the like and more particularly to apparatus for detecting and checking such members for any departure from prescribed standards.

In the manufacture of gears and other members having gear like teeth, certain defects may be introduced in the manufacturing process which will cause the gear to be unacceptable for its intended use. These defects or errors include eccentricity, out of round, wobble, lack of parallelism, irregularities in teeth formation or disposition and the like. In the past gear members have been checked separately for each such error to determine whether or not any of these defects exceed prescribed tolerances. Those members having errors beyond the prescribed limits have been rejected as unacceptable for general use.

It has been found that not all gear members rejected because of some one individual error which exceeds the established tolerance are necessarily unacceptable for use. Certain errors or defects in these gear members have an effect upon other errors; some of which are additive and others of which may cancel or reduce the other to within prescribed tolerances. It is necessary, therefore, to be able to inspect gear members not only as to individual errors, some of which may later be corrected, but also to be able to inspect such members as to the cumulative effect of all errors incident thereto.

It is now proposed to provide a device adaptable for checking gear members and for detecting manufacturing and other defects therein. The proposed device includes means for determining the character of defect and its extent as well as means for testing a gear member having defects to determine its acceptance for use with another member despite certain individual errors which may be beyond prescribed tolerances. It is proposed to provide a compact device for inspecting gear members for all errors during a single operational step thereby eliminating a plurality of separate checking operations.

Figure 1:
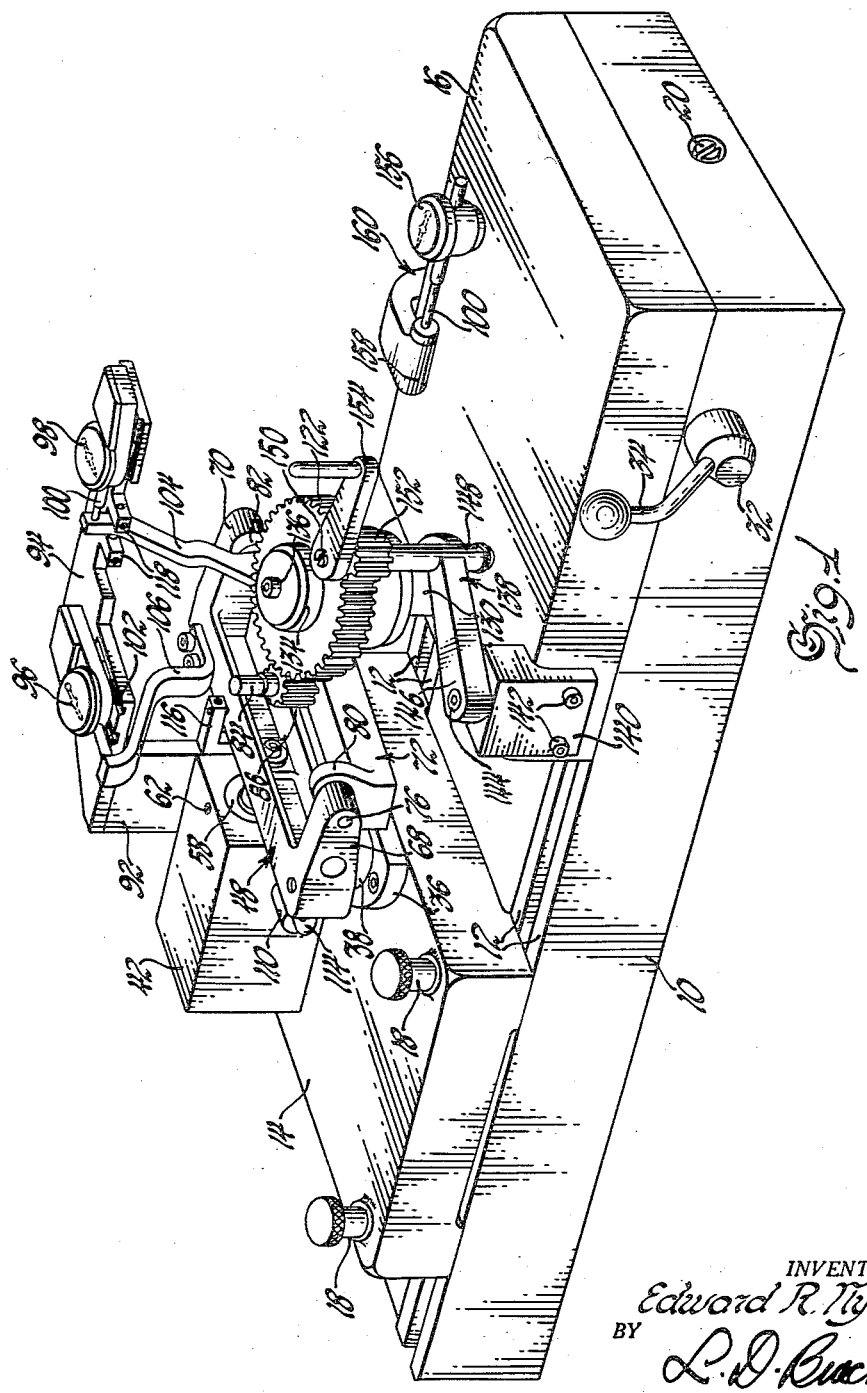
Figure 1 is a perspective view of the proposed gear checking device.
Figure 2:
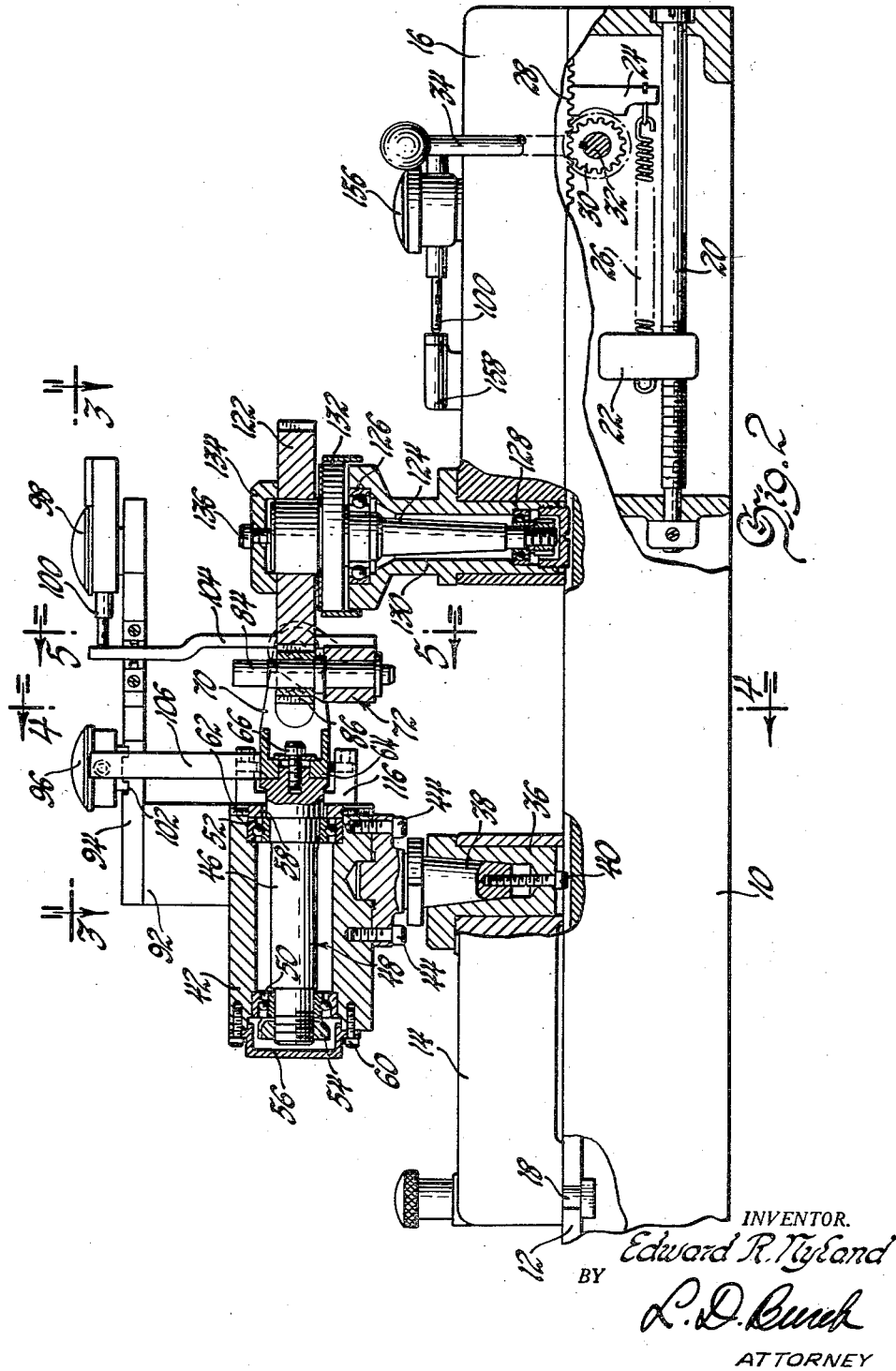
Figure 2 is a side elevational view of the gear testing device having parts broken away and shown in cross-section.

The gear checking apparatus includes a base member 10 having guide rails 12 formed along opposite sides thereof and carriage members or slide blocks 14 and 16 mounted upon the guide rails and disposed at opposite ends of the base member. The one slide block 14 includes fastening means 18 extended therethrough and engaging the underside of the guide rails 12 to hold the slide block in fixed relation to the base member 10. The other slide block 16 is biased towards the first slide block 14 by means of an adjustable feed screw 20 mounted within the base member 10 and having a travel nut 22 threaded thereon and connected to a depending lug 24 of the slide block 16 by a spring member 26. A rack section 28 is formed on the underside of the slide block 16 and is engaged by a pinion 30 on a shaft 32 mounted across the base member 10. A handle 34 is provided on the shaft 32 whereby the pinion 30 may be rotated and the slide block 16 backed off from the first slide block 14. A flanged bearing sleeve 36 is secured within the first slide block 14 and receives a columnar support 38 journaled therein and secured thereto by fastening means 40. A housing member 42 is secured to the support 38 by fastening means 44 and is adapted to receive the stub shaft 46 of a yoke member 48 within ball bearings 50 and 52 mounted therein. A lock nut 54 is threaded upon the after end of the stub shaft 46 and the ends of the housing 42 are closed off by end plates 56 and 58 secured at opposite ends of the housing by fastening means 60 and 62.

Figure 3:
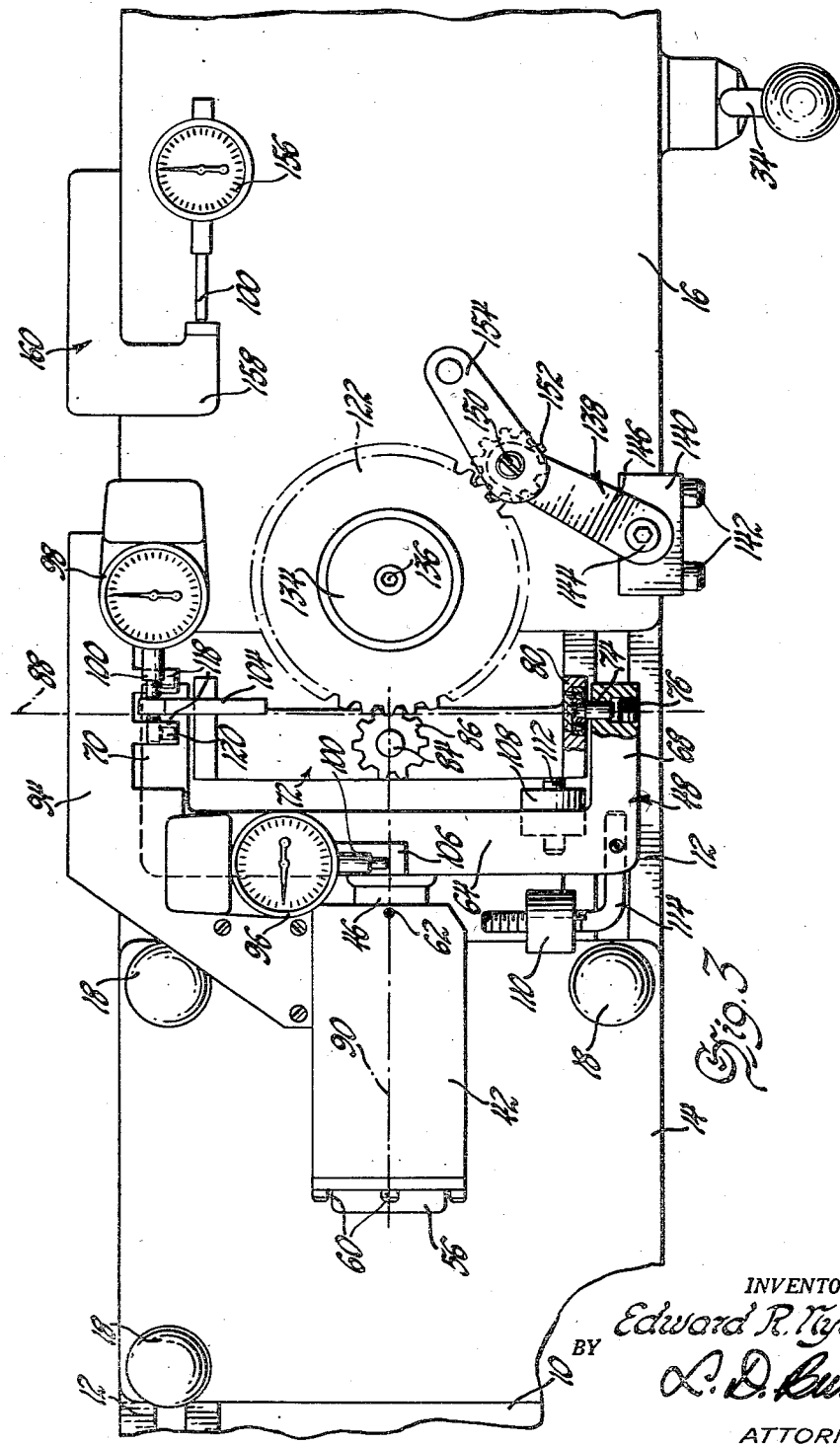
Figure 3 is a top view of the proposed gear checker and is viewed substantially in the plane of line 3—3 of Figure 2 looking in the direction of the arrows thereon.
Figure 4:
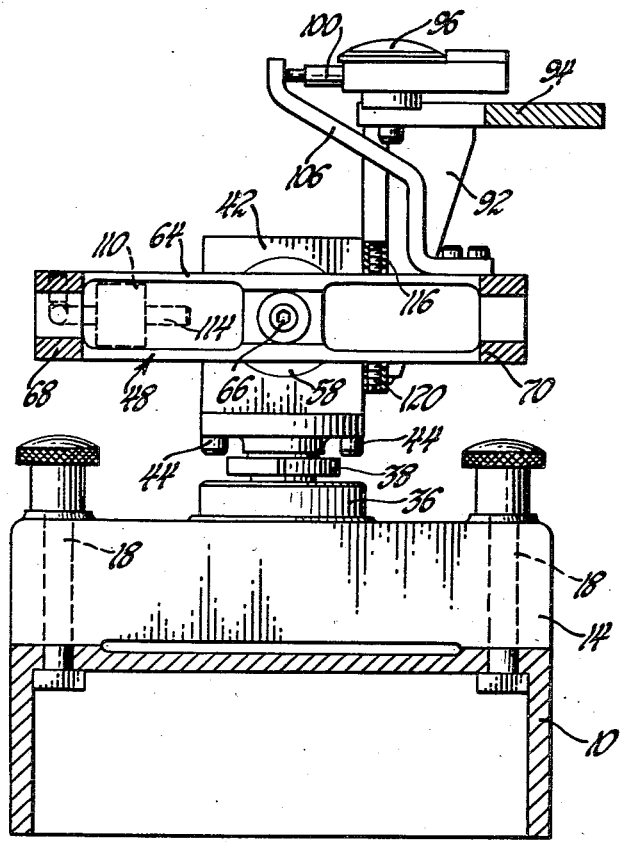
Figure 4 is a cross-sectional view of a part of the gear checking device as viewed in the plane of line 4—4 of Figure 2 looking in the direction of the arrows thereon.
Figure 5:
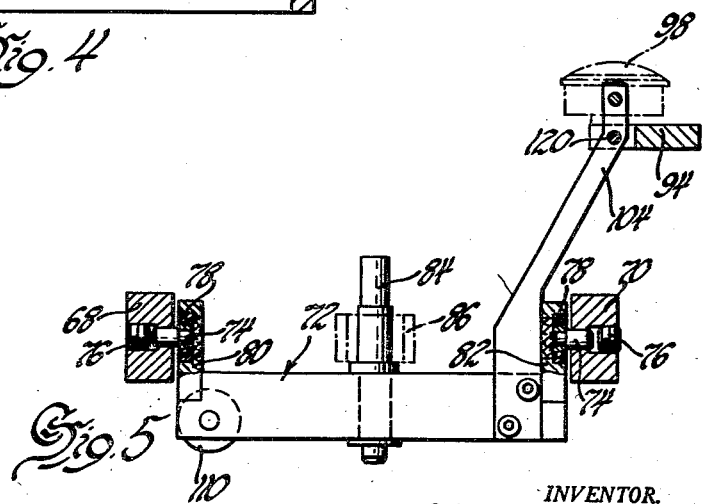
Figure 5 is a cross-sectional view of another part of the gear checking device as viewed in the plane of line 5—5 of Figure 2 looking in the direction of the arrows thereon.

The yoke member 48 includes the stub shaft 46 with a cross bar 64 secured to the end thereof by fastening means 66 and having parallel spaced arms 68 and 70 extended horizontally outward therefrom at opposite ends of the cross bar. A cradle 72 is mounted or hung between the arms 68 and 70 of the yoke member 48 upon pintle pins 74 provided within the ends of the arms and backed up by set screws 76. Ball bearing means 78 are secured within the upstanding ends 80 and 82 of the cradle 72 for receiving the pintle pins 74. An arbor 84 upon which is received the gear member 86 to be inspected, is provided upon the cradle 72 with the axis thereof disposed transversely of the axes 88 and 90 about which both the cradle 72 and yoke member 48 are rotatable, refer to Figure 3, with the arbor and yoke axes intersecting and the cradle axis 88 disposed to lie substantially tangential to the base circle of the gear member 86 to be inspected.

A support bracket 92 is secured to one side of the housing member 42 for holding a platform 94 in fixed spaced relation over the yoke and cradle members 48 and 72. Tolerance gauges 96 and 98 are mounted upon the platform 94 and have their actuating plungers 100 extended in transverse directions for reasons which will be explained later. The gauges 96 and 98 are here shown as adapted for linear adjustment within guideways 102. However, since the gauges once aligned and adjusted are fixed in position any convenient mounting means may be employed.

Gauge feeler arms 104 and 106 are secured to the cradle 72 and yoke member 48, respectively, and have their outermost ends disposed adjacent the plungers 100 of the tolerance gauges 96 and 98. The plungers 100 of the tolerance gauges 96 and 98 will be noted to lie in planes substantially tangential of the arc of a circle generated by the arms 106 and 104, respectively, in rotating about axes 90 and 88 and the ends of the arms are formed to engage their respective tolerance gauging plunger means in a plane including the pivotal axis of the member to which each arm is respectively secured and a line normal thereto. Such disposition permits relatively pure linear engagement of the arms 104 and 106 with the plungers 100. The arms 104 and 106 are counterbalanced by adjustable counterweights 108 and 110 threaded upon rods 112 and 114 secured to the cradle and yoke members 72 and 48. Considerable increased sensitivity is provided in the proposed arrangement in that the minute defections of the cradle 72 and yoke member 48 are magnified by taking deflection measurements upon the larger arc generated by the gauge feeler arms 104 and 106 rather than directly form the arc generated by the cradle and yoke members themselves.

Stops 116 and 118 are formed from the support bracket 92 and platform 94, respectively, on opposite sides of both the cross bar 64 of the yoke member and the arm 104 of the cradle. Set screws 120 are threaded through the stops 116 and 118 to provide adjustable means for limiting the deflection of the yoke and cradle members 48 and 72. Excessive deflection of the yoke and cradle members is prevented to avoid damaging the tolerance gauges 96 and 98.

A master gear member 122 is mounted upon the slide block 16 in a fixed horizontal plane for driving engagement with the gear member 86 to be inspected. The master gear 122 is received upon the upper end of a spindle 124 mounted for rotation within ball bearing members 126 and 128 disposed within a supporting sleeve member 130 secured to the slide block 16. The master gear 122 is received upon a collar 132 of the spindle 124 and is held thereon by a cap 134 engaged with the spindle by fastening means 136. The master gear 122 is held in meshing engagement with the gear 86 to be inspected by the biased relation of the one slide block 16 to the other block 14. The master gear 122 may be rotated by hand or by mechanical means 138 as here shown. A mounting block 140 is secured to the side of the slide 16 by fastening means 142 and includes a pin 144, arm 146, sleeve 148 and spindle 150 with a drive gear 152 and handle 154 secured thereto whereby the drive gear 152 may be moved into driving engagement with the master gear 122 and rotated by the handle 154.

A linear displacement gauge 156 is mounted upon the slide block 16 and has its plunger 100 engaged by an arm 158 of a member 160 secured to the base member 10 and disposed in spaced relation to the slide block.

The proposed gear checking device may be adapted to inspect any size gear member by changing the cradle 72 upon which the test gear 86 is to be mounted. This is advisable in order that the theoretical base circle of the test gears will lie approximately tangential of the axis 88 about which the cradle 72 is mounted to the yoke member 48. It is preferable to change cradles with each different size gear rather than provide means for adjusting the position of the gear receiving arbor 84 since such adjustment would be subject to human errors and the fastening means might alloy the arbor to creep out of position.

A master test gear is positioned on the arbor 84 to allow preadjustment of the gear checker. The cradle 72 and yoke member 48 are balanced by adjustment of their respective counterweights 108 and 110, the limiting set screws 120 in the stops 116 and 118 are properly set, and the dial faces of the tolerance gauges 96 and 98 and of the displacement gauge 156 are set at zero readings.

Once the gear checker has been set up for inspecting gear members of a certain size and the master test gear removed, other gear members may be inspected in rapid succession. The handle 34 is first rotated to back off the slide block 16 and master gear 122 mounted thereon. A gear member 86 to be inspected is placed on the cradle arbor 84. The handle 34 is released and the master gear 122 is biased by the spring 26 in meshing engagement with the test gear 86. The drive gear 152 is moved into drive engagement with the master gear 122 and its handle 154 rotated as desired.

Each tooth of the test gear 86 may be inspected individually or the gear member may be spot checked as desired. If any of the teeth of the test gear are inclined to a different extent than the teeth of the master gear 122 the yoke member 48 will be caused to tilt and the arm 106 secured thereto will actuate the plunger 100 of the tolerance gauge 16 showing the extent of variation. If there are any defects in the taper of the teeth of the test gear 86 the cradle 71 will be caused to tilt and he arm 104 secured thereto will actuate the plunger 100 of the tolerance gauge 98. Errors or defects in either transverse plane of detection will not affect the readings as to errors in any other plane of detection. Consequently, each dial may indicate errors in both planes at the same time. If the gear member 86 under inspection is out of round, eccentric, or its axis is not properly aligned with respect to the disposition of its teeth, the master gear 122 will be moved relative to the gear receiving arbor 84 and against the action of the biasing spring 26. Such movement is translated through the slide block 16, which is limited by the guide rails 12 to linear movement, to the gauge 156.

As previously mentioned, defects which are beyond prescribed tolerances in either plane of detection, that is as indicated by the yoke and cradle members 48 and 72, are not alone determinative of an unsatisfactory gear member. For example, a gear member may be eccentric but it may also have tapered teeth which cancel out or reduce the prevalence of its eccentricity. The extent of the defect in any plane of detection may be just beyond the prescribed tolerance but not such as is detrimental in view of other minor errors which themselves may be within prescribed tolerances and are also such as reduce the extent of the over tolerance defect to within acceptable limits.

The proposed gear checking device is compact, has all gauge means disposed for easy reading, and is adapted to accommodate gears of different sizes with but slight modification. The inspection of gears permits the perception of defects individually as well as cumulatively thereby assuring final rejection of only those gears which will not perform properly.

I claim:

A gear checking device which includes gimbal means universally mounting a gear member for inspection, said gimbal means including a member pivotal about an axis tangent to the base circle of said gear member and another member pivotal about an axis normal to said first-mentioned axis, means receiving and biasing a driving gear member in meshing engagement with said first-mentioned gear member in a plane normal to the planes including the axes of said pivotal members, tolerance gauging means mounted upon said device and operatively disposed for engagement with said pivotal members normal to and in the plane of the respective pivotal axis of the pivotal member with which engaged for separately detecting individual errors in said gear member, another tolerance gauging means mounted upon said device and operatively disposed for engagement with said driving gear receiving means for detecting cumulative errors in said gear member being inspected, gauge feeler arms secured to said pivotal member and bent and formed to dispose a gauge engaging surface thereof normal to said tolerance gauging means and in the plane of the respective pivotal axis of the pivotal member to which secured, and counterweight members secured to said pivotal members for counterbalancing the weight of said gauge feeler arms on said pivotal members.

References Cited in the file of this patent

UNITED STATES PATENTS

| | | |
|---|---|---|
| 1,222,392 | Green et al. | Apr. 10, 1917 |
| 2,348,712 | Dahlerup | May 16, 1944 |
| 2,367,004 | Chitwood | Jan. 9, 1945 |
| 2,447,445 | Widen | Aug. 17, 1948 |
| 2,563,910 | Bean | Aug. 14, 1951 |

FOREIGN PATENTS

| | | |
|---|---|---|
| 460,008 | Great Britain | Jan. 19, 1937 |

U. S. DEPARTMENT OF COMMERCE
PATENT OFFICE
CERTIFICATE OF CORRECTION

Patent No. 2,821,024                                        January 28, 1958

Edward R. Nyland

It is hereby certified that error appears in the printed specification of the above numbered patent requiring correction and that the said Letters Patent should read as corrected below.

Column 3, line 49, for "alloy" read --allow--; column 4, line 3, for "cradle 71" read --cradle 72--; line 4, for "he arm" read --the arm--.

Signed and sealed this 20th day of May 1958.

(SEAL)
Attest:
KARL H. AXLINE
Attesting Officer

ROBERT C. WATSON
Commissioner of Patents